United States Patent
Martin

(10) Patent No.: US 6,645,400 B2
(45) Date of Patent: Nov. 11, 2003

(54) CORROSION CONTROL UTILIZING A HYDROGEN PEROXIDE DONOR

(75) Inventor: Roy Martin, Downers Grove, IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 10/013,879

(22) Filed: Dec. 10, 2001

(65) Prior Publication Data
US 2002/0043650 A1 Apr. 18, 2002

Related U.S. Application Data

(62) Division of application No. 09/603,764, filed on Jun. 22, 2000.

(51) Int. Cl.[7] .......................... C23F 11/12; C23F 11/04; C02F 1/72
(52) U.S. Cl. .................. 252/396; 252/387; 252/397; 252/407; 252/175; 252/180; 210/759; 210/698; 106/14.11; 106/14.24; 422/12; 422/13
(58) Field of Search .................. 252/387, 396, 252/397, 407, 80, 86, 87, 175, 180, 181; 422/12, 13; 210/696, 698, 758, 759, 760, 761, 764; 106/14.11, 14.24

(56) References Cited

U.S. PATENT DOCUMENTS 2,008,684 A    7/1935   Craddock (List continued on next page.)

FOREIGN PATENT DOCUMENTS

| DE | 262 139 | | 11/1988 |
|---|---|---|---|
| EP | 0 257 740 | | 2/1988 |
| EP | 0 504 621 | * | 9/1992 |
| EP | 0504621 A1 | | 9/1992 |
| GB | 2281742 A | | 3/1995 |
| LU | 80951 | | 2/1979 |
| WO | 89/08728 | * | 9/1989 |
| WO | WO 89/08728 A1 | | 9/1989 |
| WO | WO 96/30307 A1 | | 10/1996 |
| WO | WO 00/34760 A1 | | 6/2000 |
| WO | WO 01/98558 A2 | | 12/2001 |

OTHER PUBLICATIONS

Dexter et al., "Use and Limitation of Electrochemical Techniques for Investigating Microbiological Corrosion", Corrosion, 1991, vol. 47, No. 4, pp. 308–318.

(List continued on next page.)

Primary Examiner—Joseph D. Anthony
(74) Attorney, Agent, or Firm—Lowrie, Lando & Anastasi

(57) ABSTRACT

The present invention describes an innovative means of inhibiting corrosion of metals which experience active-passive transition in contact with an electrolyte. This invention incorporates hydrogen peroxide and/or peroxycarboxylic acids or their constituents to inhibit corrosion by inducing passivation of the metal. Application of this technology reduces the potential for fouling, scaling and deposition as well as outperforming existing methods of corrosion control in these applications.

7 Claims, 8 Drawing Sheets

U.S. PATENT DOCUMENTS

| | | | |
|---|---|---|---|
| 2,212,260 | A | 8/1940 | Brothman |
| 2,249,263 | A | 7/1941 | Wheelwright, Jr. |
| 2,268,461 | A | 12/1941 | Nichols |
| 2,556,014 | A | 6/1951 | Tolman |
| 2,651,582 | A | 9/1953 | Courtney |
| 2,686,110 | A | 8/1954 | Carver |
| 2,740,696 | A | 4/1956 | Longwell |
| 3,252,689 | A | 5/1966 | Blomgren, Sr. et al. |
| 3,319,937 | A | 5/1967 | Wilson et al. |
| 3,389,970 | A | 6/1968 | Scheibel |
| 3,536,646 | A | 10/1970 | Hatch et al. |
| 3,559,959 | A | 2/1971 | Davis et al. |
| T896,051 | I4 | 3/1972 | Hamlin et al. |
| 3,702,298 | A | 11/1972 | Zsoldos et al. |
| 3,742,735 | A | 7/1973 | Verreyne et al. |
| 3,747,899 | A | 7/1973 | Latinen, deceased et al. |
| 3,756,570 | A | 9/1973 | Bühner |
| 3,794,817 | A | 2/1974 | Shinskey |
| 3,852,234 | A | 12/1974 | Venema |
| 3,965,027 | A | 6/1976 | Boffardi et al. |
| 4,016,078 | A | 4/1977 | Clark |
| 4,113,688 | A | 9/1978 | Pearson |
| 4,125,574 | A | 11/1978 | Kastner et al. |
| 4,146,676 | A | 3/1979 | Saeman et al. |
| 4,171,166 | A | 10/1979 | Trowbridge et al. |
| 4,217,145 | A | 8/1980 | Gaddis |
| 4,218,147 | A | 8/1980 | Rosenberger |
| 4,233,265 | A | 11/1980 | Gasper |
| 4,234,440 | A * | 11/1980 | Hirozawa et al. ............. 252/76 |
| 4,241,016 | A | 12/1980 | Hirozawa et al. |
| 4,243,636 | A | 1/1981 | Shiraki et al. |
| 4,300,909 | A | 11/1981 | Krumhansl |
| 4,433,701 | A | 2/1984 | Cox et al. |
| 4,470,907 | A | 9/1984 | Seneza |
| 4,522,502 | A | 6/1985 | Brazelton |
| 4,550,011 | A | 10/1985 | McCollum |
| 4,575,678 | A | 3/1986 | Hladky |
| 4,581,074 | A | 4/1986 | Mankina et al. |
| 4,648,043 | A | 3/1987 | O'Leary |
| 4,664,528 | A | 5/1987 | Rodgers et al. |
| 4,701,055 | A | 10/1987 | Anderson |
| 4,719,252 | A | 1/1988 | Dutton et al. |
| 4,747,978 | A | 5/1988 | Loehr et al. |
| 4,752,740 | A | 6/1988 | Steininger |
| 4,913,822 | A * | 4/1990 | Chen et al. ................. 210/699 |
| 4,965,016 | A | 10/1990 | Saitoh et al. |
| 4,977,292 | A | 12/1990 | Hwa et al. |
| 5,000,866 | A * | 3/1991 | Woyciesjes ............... 252/78.3 |
| 5,004,549 | A | 4/1991 | Wood et al. |
| 5,018,871 | A | 5/1991 | Brazelton et al. |
| 5,030,334 | A | 7/1991 | Hale |
| 5,061,456 | A | 10/1991 | Brazelton et al. |
| 5,112,521 | A | 5/1992 | Mullins et al. |
| 5,130,033 | A | 7/1992 | Thornhill |
| 5,135,968 | A | 8/1992 | Brazelton et al. |
| 5,139,627 | A | 8/1992 | Eden et al. |
| 5,164,429 | A | 11/1992 | Brazelton et al. |
| 5,213,694 | A | 5/1993 | Craig |
| 5,239,257 | A | 8/1993 | Muller et al. |
| 5,256,307 | A | 10/1993 | Bachhofer et al. |
| 5,262,963 | A | 11/1993 | Stana et al. |
| 5,306,355 | A | 4/1994 | Lagana |
| 5,306,432 | A | 4/1994 | Puetz |
| 5,316,031 | A | 5/1994 | Brazelton et al. |
| 5,320,748 | A | 6/1994 | Dupuis |
| 5,332,511 | A | 7/1994 | Gay et al. |
| 5,382,367 | A | 1/1995 | Zinkan et al. |
| 5,422,014 | A | 6/1995 | Allen et al. |
| 5,424,032 | A | 6/1995 | Christensen et al. |
| 5,489,344 | A | 2/1996 | Martin et al. |
| 5,494,588 | A | 2/1996 | LaZonby |
| 5,575,920 | A * | 11/1996 | Freese et al. ............... 210/697 |
| 5,658,467 | A | 8/1997 | LaZonby et al. |
| 5,683,654 | A | 11/1997 | Dallmier et al. |
| 5,736,097 | A * | 4/1998 | Ono ........................... 422/14 |
| 5,770,039 | A | 6/1998 | Rigney et al. |
| 5,783,092 | A | 7/1998 | Brown et al. |
| 5,785,867 | A | 7/1998 | LaZonby et al. |
| 5,800,732 | A | 9/1998 | Coughlin et al. |
| 5,814,233 | A | 9/1998 | Starkey et al. |
| 5,814,247 | A * | 9/1998 | Derule et al. ............... 252/396 |
| 5,820,256 | A | 10/1998 | Morrison |
| 5,849,985 | A | 12/1998 | Tieckelmann et al. |
| 5,855,791 | A | 1/1999 | Hays et al. |
| 5,858,246 | A | 1/1999 | Rafter et al. |
| 5,858,249 | A | 1/1999 | Higby |
| 5,866,013 | A * | 2/1999 | Kessler et al. .............. 210/701 |
| 5,882,526 | A | 3/1999 | Brown et al. |
| 5,888,374 | A | 3/1999 | Pope et al. |
| 5,895,565 | A | 4/1999 | Steininger et al. |
| 5,902,751 | A | 5/1999 | Godec et al. |
| 5,947,596 | A | 9/1999 | Dowd |
| 5,972,196 | A | 10/1999 | Murphy et al. |
| 5,980,758 | A | 11/1999 | LaZonby et al. |
| 5,985,155 | A | 11/1999 | Maitland |
| 6,015,484 | A | 1/2000 | Martinchek et al. |
| 6,030,842 | A | 2/2000 | Peachey-Stoner |
| 6,045,706 | A | 4/2000 | Morrison et al. |
| 6,068,012 | A | 5/2000 | Beardwood et al. |
| 6,106,770 | A | 8/2000 | Ohki et al. |
| 6,120,619 | A | 9/2000 | Goudiakas et al. |
| 6,120,698 | A | 9/2000 | Rounds et al. |
| 6,132,593 | A | 10/2000 | Tan |
| 6,143,184 | A | 11/2000 | Martin et al. |
| 6,146,538 | A | 11/2000 | Martin |
| 6,149,819 | A | 11/2000 | Martin et al. |
| 6,159,552 | A | 12/2000 | Riman et al. |
| 6,238,555 | B1 | 5/2001 | Silveri et al. |
| 6,284,144 | B1 | 9/2001 | Itzhak |
| 6,315,950 | B1 | 11/2001 | Harp et al. |
| 6,409,926 | B1 | 6/2002 | Martin |
| 6,419,817 | B1 | 7/2002 | Martin |
| 6,423,234 | B1 | 7/2002 | Martin |
| 2002/0043650 | A1 | 4/2002 | Martin |
| 2002/0152036 | A1 | 10/2002 | Martin |

OTHER PUBLICATIONS

Gusmano et al., "Electrochemical Noise Resistance as a Tool for Corrosion Rate Prediction", Corrosion, 1997, vol. 53, No. 11, pp. 860–868.

Kim, Yong H., "On the Activation of Polymeric Flocculants," AIChE Annual Spring Meeting, Houston, TX, Apr. 2–6, 1989.

U.S. Filter/Stranco, "Total Dissolved Solids, Friend or Foe?", Aquatic Technology Newsletter, vol. 1, No. 2, 1988: pp. 1–7.

U.S. Filter/Stranco, "The Relationship of ORP to PPM and Its Automated Control," Aquatic Technology Newsletter, vol. 1, No. 3, 1999, pp. 1–5.

U.S. Filter/Stranco, "The Chemistry and Control of Chloramines," Aquatic Technology Newsletter, vol. 1, No. 4, 1999, pp. 1–5.

U.S. Filter/Stranco, "Why Do I Have Algae In My Pool?" Aquatic Technology Newsletter, vol. 1, No. 6, 1999, pp. 1–2.

Carpenter, Colleen et al., "Chlorine Disinfection of Recreational Water for *Cryptosporidium parvum,*" *Emerging Infections Diseases*, vol. 5, No. 4, Jul.–Aug. 1999, pp. 579–584.

U.S. Filter/Stranco, "ECS–Pool (w/CHF–150) Engineering Packet," Apr. 22, 1999.

Kowalsky, L., "Pool–Spa Operators Handbook," National Swimming Pool Foundation, 1983–1990.

U.S. Filter/Stranco, "Strantrol Automated Water Chemistry Control for Commercial Pools," 1998.

U.S. Filter/Stranco, "Strantrol System 3 Pool & Spa Chemistry Controller," 2000.

U.S. Filter/Stranco, "Strantrol System 4 Pool & Spa Chemistry Controller," 2000.

U.S. Filter/Stranco, "Strantrol System5F Pool & Spa Chemistry Controller," 2000.

U.S. Filter/Stranco, "Strantrol System6 Pool Chemistry & Filter Backwash Controller," 2000.

U.S. Filter/Stranco, "Strantrol System7 Mechanical Room Controller for Aquatic Facilities," 2000.

Kloberdanz, B., "The Air in There: Enhancing an Indoor Pool Environment," Recreation Management, 2000.

Selvick, E., "Take Control of 'Yo–Yo' Treatment Cycles," International Aquatics, National Trade Publications, Inc., Jul./Aug. 1997.

Frazier, B., "Automation to the Rescue," Aquatics International, May/Jun. 1998.

Batt, T. et al., "The Water Down Under," Parks & Recreation, Nov. 1999.

Krone, D., "Automated Water Chemistry Control at University of Virginia Pools," Facilities Manager, vol. 13, No. 6, Nov./Dec. 1997.

U.S. Filter/Stranco, "Remote Monitoring for Unstaffed Pools," Parks & Recreation, Nov. 1997.

U.S. Filter/Stranco, "Environmental Control at Indoor Pool: New ECS System Eliminates Chronic Air Quality Woes For New York School District Pool," Stranco Products Capsule Case History #806, Jul. 1998.

U.S. Filter/Stranco, "Environmental Control at Indoor Pool Complex: New ECS System Optimizes Air & Water Quality at Colorado Recreation Center," Stranco Products Capsule Case History #807, Nov. 1998.

U.S. Filter/Stranco, "Environmental Control at Indoor Pool: Parks District Uses New ECS System to Eliminate Chronic Air Quality Problems at High School Pool," Stranco Products Capsule Case History #808, May 1999.

U.S. Filter/Stranco, "Environmental Control at Indoor Pool: ECS System Optimizes Air & Water Quality at Texas School District Swim Center," Stranco Products Capsule Case History #811, Nov. 1999.

U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, Oct. 1999.

U.S. Filter/Stranco, "Environmental Control at Indoor Pool: ECS System Eliminates Chronic Air Quality Problems at High School and Parks Districts Indoor Pool Facility," Stranco Products Capsule Case History #813, Jul. 2000.

U.S. Filter/Stranco, "Environmental Control at Indoor Pool: ECS System Optimizes Air & Water Quality at Iowa Recreaction Center," Stranco Products Capsule Case History #814, May 2000.

U.S. Filter/Stranco, "Air & Water Quality Control for Indoor Aquatic Facilities," U.S. Filter Corporation, 1998.

U.S. Filter/Stranco, "Strantrol ECS—Environmental Control System (For Pool)," Pool.

Williams, K., "Aquatic Facility Operator Manual," National Recreation and Park Association, Second Edition, 1995.

Normenausschusse Wasserwesen, "Treatment and disinfection of water used in bathing facilities," DIN 19643–4, Feb. 1999.

Normenausschusse Wasserwesen, "Treatment and disinfection of water used in bathing facilities," DIN 19643–3, Apr. 1997.

Normenausschusse Wasserwesen, "Treatment and disinfection of water used in bathing facilities," 19643–2, Apr. 1997.

Normenausschusse Wasserwesen, "Treatment and disinfection of water used in bathing facilities," DIN 19643–1, Apr. 1997.

Stranco, "The Best of Poolfax," The Poolfax Newsletter, 1981–1984.

Victorin et al., "Redox potential measurements for determining the disinfecting power of chlorinated water," *J. Hyg., Camb.,* 70, 1972, pp. 313–323.

U.S. Filter/Stranco, "Environmental Control System Training Meeting, Mar. 15, 2000".

Kim, Yong H., "Evaluation of Redox Potential and Chlorine Residual as a Measure of Water Disinfection," presented at the 54th International Water Conference, Pittsburgh, PA, Oct. 11–13, 1993.

Scully et al., Disinfection Interference in Wastewaters by Natural Organic Nitrogen Compounds, *Environ. Sci. Techn.,* vol. 30, No. 5, 1996, pp. 1465–1471.

Carlson, S., "Fundamentals of water disinfection," *J. Water SRT—Aqua,* vol. 40, No. 6, (1991), pp. 346–356.

Lund, E., "Oxidation Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–49.

Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer–Verlag, (1961), pp. 100–110.

Lund, E., "Inactivation of Poliomyelitis Virus by Chlorination at Different Oxidation Potentials," from the Virological Laboratory of the Department of Bacteriology, University of Gothenburg, and the Virological Department of the Municipal Laboratories, Gothenburg, Sweden, Springer–Verlag, (1961), pp. 330–342.

Lund, E., "The Significance of Oxidation in Chemical Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–13.

Lund, E., "The Rate of Oxidative Inactivation of Poliovirus and its Dependence on the Concentration of the Reactants," from the Virological Laboratory of the Departement of Bacteriology, University of Gothenburg, and the Virological Department of the Municipal Laboratories, Gothenburg, Sweden, Springer–Verlag, (1963), pp. 1–18.

Hensley, R. et al., "Disinfection Metamorphosis: From Chemicals to Control," *Operations Forum,* vol. 12, No. 4, Apr. 1995.

Hetzler, J.T. et al., "ORP: A Key to Nutrient Removal," *Operations Forum,* vol. 12, No. 2, Feb. 1995.

Bossard, G. et al., "Optimizing Chlorination/Dechlorination at a Wastewater Treatement Plant," reprinted from *Public Works,* Jan. 1995.

Ryan, D. et al., "Waste Not, Want Not: Avoiding Chemical Excesses," reprinted from *Operations Forum,* vol. 11, No. 4, Apr. 1994.

D'Adam, D. et al., "A Case Study of Wastewater Plant Disinfection," reprinted from *Public Works Magazine,* Nov. 1994.

"Louisiana Plant Uses New Technology for Dechlorination," reprinted from *American City & County,* Feb. 1994.

Kiser, P. et al., "ORP or Residual: Which Measures Oxidation?" Sep. 10, 1992, pp. 1–7.

"Acu–Trol Programmable Controllers," Product Literature from www.acu–trol.com, printed Nov. 19, 1999.

"Chemtrol Automatic Pool Controllers," Product Literature from www.sbcontrol.com, printed Nov. 19, 1999.

"Chemtrol—PC6000 Controller," Product Literature from www.sbcontrol.com, printed Nov. 19, 1999.

"Chemtrol—PC3000 Controller," Product Literature from www.sbcontrol.com, printed Nov. 19, 1999.

"AK100 Swimming Pool Control Systems," Product Literature from www.acu–trol.com, printed Nov. 19, 1999.

Aquasol Controllers, Inc., "What is a Controller?" Product Literature from www.aquasol.com, printed Nov. 19, 1999.

Aquasol Controllers, Inc., "Aquasol WTC Specifications," Product Literature from www.aquasol.com, printed Nov. 19, 1999.

Aquasol controllers, Inc., "Aquasol SPC Specifications," Product Literature from www.aquasol.com, printed Nov. 19, 1999.

Acu–Trol, "AK100 Summary," Product Literature from www.acu–trol.com, printed Nov. 19, 1999.

Rola–Chem Corporation, "The New Wave in Water Management: Take Control with Rola–Chem," Product Catalog, Apr. 1999.

Mansfeld et al., "Electrochemical Noise Analysis of Iron Exposed to NaCl Solutions of Different Corrosivity," *J. Electrochem. Soc.,* vol. 141, No. 5, May 1994, pp. 1402–1404.

Brusamarello et al., "Analysis of Different Methods to Calculate Electrochemical Noise Resistance Using a Three–Electrode Cell," *Corrosion,* vol. 56, No. 3, March, 2000, pp. 273–282.

Mansfeld et al., "Electrochemical Noise Analysis of Iron Exposed to NaCl Solutions of Different Corrosivity," *J. Electrochem Soc.,* vol. 140, No. 8, Aug. 1993, pp. 2205–2209..

* cited by examiner

ECN PEROXIDE-CITRIC ACID (130ppm)

CORROSION CONTROL UTILIZING A HYDROGEN PEROXIDE DONOR

This application is a Divisional of prior application Ser. No. 09/603,764, filed on Jun. 22, 2000, entitled CORROSION CONTROL UTILIZING A HYDROGEN PEROXIDE DONOR now pending.

FIELD OF THE INVENTION

This invention relates to a method of inhibiting corrosion as well as inhibiting scale and deposit formation resulting from the saturation of mineral salts, and buildup of corrosion byproducts. The invention generally relates to the inhibition of corrosion of metals in contact with an electrolyte and the reduction of insulating films owing to scale formation/deposition. The invention most particularly relates to the inhibition of corrosion on metals which experience active-passive transition by application of a hydrogen peroxide donor. Illustrative of such metals are steel(s), aluminum, titanium or mixtures thereof; however the instant invention contemplates the treatment of any metal which is capable of experiencing active/passive transitions when exposed to passivating agents.

BACKGROUND OF THE INVENTION

Corrosion of metals, particularly those metals found in cooling water circulating systems, and most particularly those in heat exchangers, are of critical concern.

In industrial cooling systems, water from rivers, lakes, ponds, wells, wastewater treatment plant effluent etc., is employed as the cooling media for heat exchangers. Such waters can contain a variety of either dissolved and/or suspended materials such as mineral salts, metals, organics, silt, mud etc.

The cooling water from a heat exchanger is typically passed through a cooling tower, spray pond or evaporative system prior to discharge or reuse. In such systems, cooling is achieved by evaporating a portion of the water passing through the system. Because of the evaporation that takes place during the cooling, both dissolved and suspended solids concentrate. The concentrating of various anionic ions such as chlorides and sulfates can increase the rate of corrosion of the metals making up the cooling system. This is especially true with the metals making up the heat exchangers that are experiencing higher temperatures.

Furthermore, contaminates such as hydrogen sulfide can also increase corrosion rates. Likewise, mineral salts, for example those of calcium and magnesium, can induce scaling of the heat exchanger. A scale common in cooling systems is calcium carbonate. Other scales or deposits such as calcium phosphate or iron can also inhibit heat transfer as well as induce under-deposit corrosion.

Deposit formation on heat exchangers seriously reduces heat transfer. Corrosion byproducts can form on the metal surface where a corrosion cell has formed. Deposits from metal oxides, silt, mud, microbiological activity, and process contamination can reduce the efficiency of heat transfer as well as increase corrosion.

Reducing the corrosion, scaling and deposition of heat exchangers and associated cooling system equipment is thus essential to the efficient and economical operation of a cooling water system. Excessive corrosion of the metallic surfaces can cause the premature failure of process equipment, necessitating down time for the replacement or repair of the equipment. Additionally, the buildup of corrosion products on the heat transfer surfaces impedes water flow and reduces heat transfer efficiency thereby limiting production or requiring down time for cleaning.

Aspects of Corrosion

In order for corrosion to occur, a corrosion cell must form. The corrosion cell consist of two half cells, the cathode, and the anode.

The cathode is defined as the point where the reduction of a reducible substance takes place. In waters where the pH is greater than 4.2 (like that of a cooling water system), the primary reducible substance is oxygen. The steps involved with the cathode include: oxygen diffusion to the metal surface, adsorb by either physical or chemical adsorption, electron transfer, rearrangement with other adsorbed materials (i.e. water and electrons with subsequent formation of hydroxide ions), de-sorption of the newly formed byproduct (hydroxide), and diffusion into the bulk meter. With increased concentration of hydroxide ions, oxygen diffusion and adsorption rates are reduced.

The anode is defined as the point where dissolution of metal ions occurs. The dissolution of metal ions at the anode is a chemical process. The reaction forms ferrous hydroxide. Initially, the potential at the anode is low; however with time, the electrical potential at the anode increases. The increased potential is the result of the increased concentration of metal ions (result of dissolution) in the immediate vicinity of the anode. The increased concentration of metal ions induces the formation of a Metal Ion Concentration Cell, as well as the reduction of oxygen. The increasing concentration of cationic charged ions at the anode increases the electrical potential of the anode.

General corrosion is defined as a state where the potential of the cathode decreases with time while the potential at the anode increases. At some point, the potentials of the cathode and anode shift or find neighboring electrodes of stronger or weaker potential. This shifting or jumping is the result of the mechanisms already described. As the hydroxide concentration at the cathode increases, oxygen adsorption decreases, and the cathodes potential goes down. At the anode, where the concentration of cationic ions increases, the demand for electrons increases, so the potential goes up. This process of electrode reversal continues across the surface of the metal resulting in a uniform loss of metal.

Pitting corrosion refers to a condition where the potential surrounding the anode is high (cathodic) and electron flow is not distributed across many anodes, therefore the electron comes from a local anode. Pitting corrosion is of great concern because of the high loss of metal from a localized area. At a metal loss rate of several mils per year (MPY), general corrosion would take many decades of continued corrosion before resulting in failure of the part, e.g. of a heat exchanger. However, in pitting corrosion, the electron flow and subsequent metal loss is from a localized area. Pitting corrosion often results in equipment failure long before reaching the expected life of the equipment, e.g. the heat exchanger.

Pitting corrosion occurs when the cathodic surface has been depolarized. Chlorides for example, compete for the metal surface with the oxygen donor. When a chloride ion is adsorbed at the metal surface, it prevents the oxygen from reaching the surface. The potential at the site is reduced, and the area becomes anodic. This induces a high flux of electrons to flow from the localized site to the surrounding cathode.

Passivation can be defined as the loss of chemical reactivity exhibited by certain metals and alloys under specific environmental conditions. The onset of passivation is associated with the formation of an oxide layer that is resistant to further oxidation.

The mechanism of passivation, as it relates to ferrous metal surfaces, involves the dissolution of metal ions, followed by formation of a ferrous hydroxide layer, followed by conversion to an insoluble ferric oxide by reaction with oxygen. Analysis of passive films indicates a layered structure with an outer layer of gamma iron oxide and an inner layer of magnetite.

Passivation occurs when we have established sufficient oxidation potential. At low oxidation potential, insufficient concentrations of oxidizer exist to establish a homogenous oxide layer; distinct anodes and cathodes exist. When sufficient oxidizer is present, the electrical potential of the entire surface is increased. The concentration of oxidizer is sufficient to induce the "flash" formation of an oxide layer. In other words, the oxidizer concentration is sufficiently high to react with the ferrous hydroxide across the entire metal surface. With increased oxidation potential, the current density increases. The current density required to induce passivation is called the critical current. At yet higher oxidizer concentrations, aggressive attack of the oxide layer occurs, and the corrosion rates increase; this is termed the transpassive region.

Passivation is a process requiring oxygen. Therefore, inhibitors that induce passivation must increase the oxidizing potential or make better use of the oxidizer present.

Inhibitors such as chromate, nitrite and hydroxide raise the oxidizing potential of the solution by directly supplying oxygen to the anode to react with the metal ions thereby reducing the formation of a metal oxide. For this reason, these inhibitors can be used in solutions without oxygen present. These oxidizing inhibitors are involved with direct oxidation of the ferrous hydroxide to ferric oxides.

Inhibitors such as phosphate, silicate, borate and molybdate are non-oxidizing inhibitors which form complexes with iron (III) species so as to stabilize them from disproportionation (the transformation of a substance into two or more substances by oxidation or reduction) to the more soluble Fe (II) species until reaction with dissolved oxygen creates the more immune oxides. These inhibitors do require the presence of oxygen to promote passivation. Their performance can be enhanced with the addition of a peroxide compound where peroxide is used to enhance the formation of a passive oxide film.

Anodic inhibition is desired from an operational viewpoint since the oxide film is very thin, and the corrosion rates are lower than that achieved by cathodic inhibition. However, the potential drawback is that if the film breaks are not repaired, due to insufficient inhibitor concentrations for example, rapid pitting may occur. This is the result of the fact that the cathodic reaction can occur all over the passive surface, but the anodic reaction (metal dissolution) can only occur at broken film sites.

Chromate treatments have been long recognized as the standard to compare other treatment programs. Chromates, induce the formation of a uniform oxide film thereby inducing passivation of the metal surface.

While chromate programs could be run at higher pH, many were operated at lower pH (6.5–7.5). This significantly lowered the potential for scale formation.

Chromate technology has been eliminated from most applications involving cooling water treatment due to the environmental and human health hazards. Since the elimination of chromates, the most common treatment methodologies now incorporate technologies that increase scale and fouling potential.

Anodic phosphate treatments require levels of phosphate exceeding those allowed by the natural solubility of phosphate when in the presence of calcium. To stabilize phosphates and inhibit scale formation, polymers that stabilize the formation of calcium phosphate salts are applied. Also, in some areas, lower phosphate levels are required to meet environmental restrictions.

Low phosphate levels can be achieved by incorporating a cathodic inhibitor like zinc. Zinc is a cathodic inhibitor that precipitates at the cathode by forming zinc hydroxide. Concentrations of peroxide and peroxycarboxylic acids can be reduced with the addition of a cathodic inhibitor such as zinc.

Again, because of the limited solubility of zinc, polymers are commonly fed to help prevent fouling from precipitation. Also, in many areas, zinc has environmental implications.

Using existing treatment methods, operating cost increased, and in many operating conditions such as high heat flux and/or high chlorides, results are less than desirable.

Thus, what is needed in the industry is a treatment program that is effective at inhibiting corrosion under various heat flux and water chemistry conditions, as well as being environmentally innocuous.

DESCRIPTION OF THE RELATED ART

U.S. Pat. No. 5,800,732 describes the use of hydrogen peroxide as a means of controlling microbial activity in an all-in-one treatment for cooling water.

U.S. Pat. No. 4,977,292 describes the development of an organic phosphorous compound using hydrogen peroxide as an oxidizer to initiate the oxidation reaction.

U.S. Pat. No. 5,382,367 describes the use of hydrogen peroxide in cooling water systems to control microbiological activity in said systems.

U.S. Pat. Nos. 5,980,758, 5,785,867, 5,658,467 and 5,494,588 describe the use of peracetic acid with nonoxidizing biocides to inhibit growth of microorganisms.

The prior art fails to describe the use of peroxide and/or peroxycarboxylic acids as standalone corrosion inhibitors, much less passivating agents, for cooling water treatment. Furthermore, no prior art reference describes the use of these compounds as on-line deposit control and deposit removal agents for said application.

SUMMARY OF THE INVENTION

The instant invention is directed toward a method which provides superior corrosion inhibition, particularly to those areas experiencing heat transfer; namely the heat exchangers where corrosion and scale potential is most prevalent. The instant process recognizes the fact that both hydrogen peroxide and peroxycarboxylic acids are strong oxidizing agents having important similarities to chromate (VI) in that they are anionic oxidizers.

Since they function as anionic oxidizers, these compounds have high solubility in water and readily diffuse to the metal surface. Being strong oxidizers as well as oxygen donors, they are able to directly supply the oxygen needed to induce passivation.

The instant process utilizes these compounds as corrosion inhibitors and passivators to achieve performance equal to or exceeding that obtained by chromate. Such performance has been demonstrated under high heat load conditions and/or in the presence of corrosion inducing ions such as chlorides. These compounds also provide an environmentally innocuous treatment that eliminates the need for other corrosion inhibitors such as zinc and phosphate based treatments, as well as their supporting polymer treatment. The instant invention teaches an innovative treatment technology having application wherever removal of scale or deposits in contact with an electrolyte is required. The invention also teaches effective removal of insulating films while inhibiting corrosion (especially under heat transfer) and can be effectively used to improve operational performance without suffering loss of system integrity or production time.

The chemistry selected for removal of the insulating layers is based on the composition of the deposits. In the test, ferrous oxide was the primary composition and therefore, peroxycitric acid solution or mineral acid was affective at removing the deposit. Other chelating, sequestering, and dispersing agents could also provide effective results when used in conjunction with peroxycarboxylic acid(s) solutions.

Accordingly, it is an objective of the instant invention to utilize hydrogen peroxide donors as corrosion inhibitors and passivators to achieve performance equal to or exceeding that obtained by chromate.

It is a further objective of the instant invention to provide an environmentally innocuous treatment that eliminates the need for other corrosion inhibitors such as zinc and phosphate based treatments, as well as their supporting polymer treatment.

It is yet another objective of the instant invention to teach a treatment technology having application wherever removal of scale or deposits in contact with an electrolyte is required.

It is a still further objective of the invention to teach effective removal of insulating films while inhibiting corrosion (especially under heat transfer) thereby improving operational performance without suffering loss of system integrity or production time.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Figure 1:
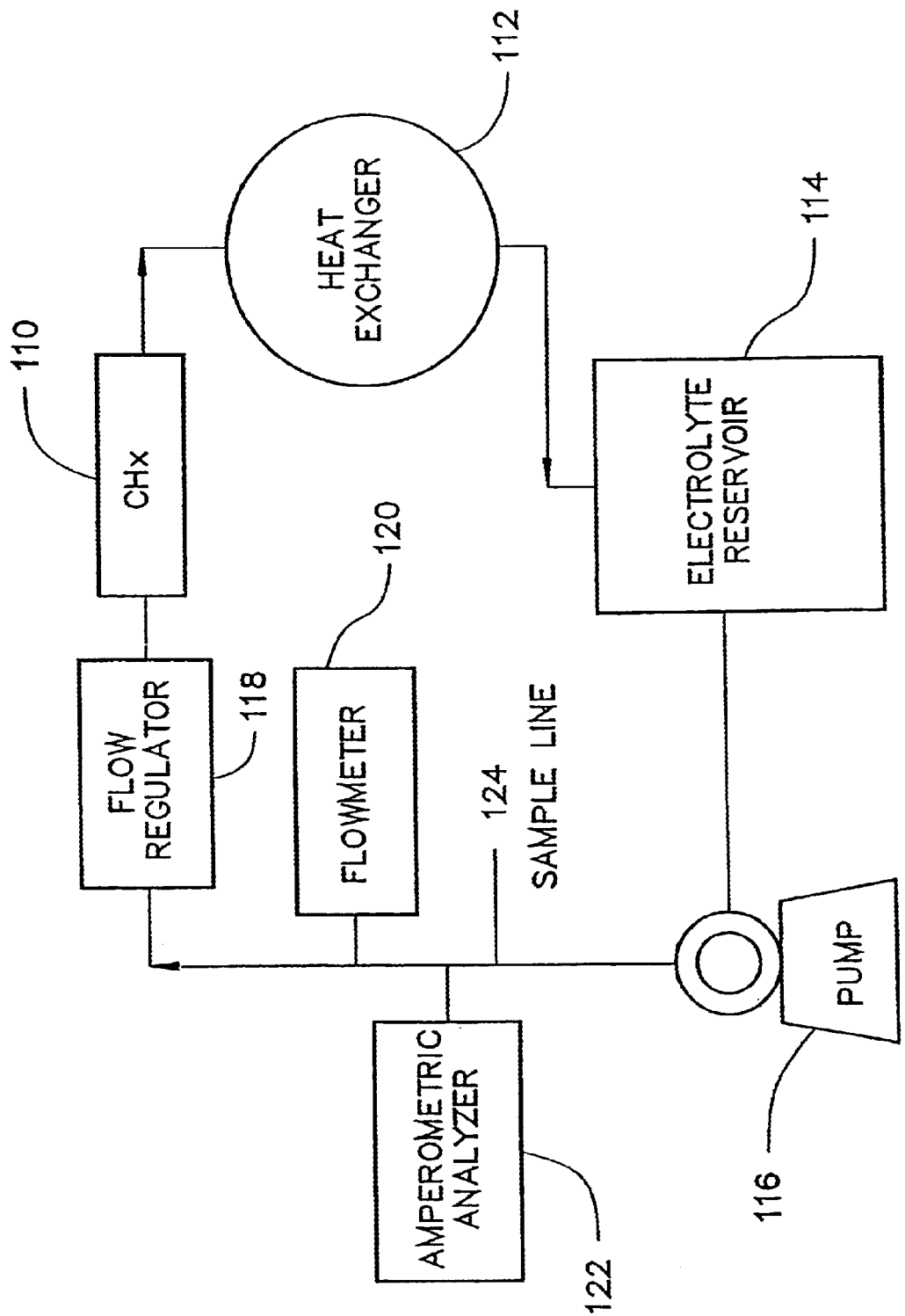
FIG. 1 is illustrative of a circulating system useful for conducting tests replicating a typical cooling water treatment application.

In accordance with FIG. 1, a system was developed incorporating the use of a heated metal element, sensors for monitoring electrochemical noise corrosion, linear polarization, and heat transfer efficiency. FIG. 1 is illustrative of a circulating system useful for conducting tests replicating a typical cooling water treatment application. Specifically, the instant device is comprised of a system that incorporates: a MENTOR CHx heat transfer device (more particularly described in FIG. 2) 110 that is made of the metallurgy to be tested. The metallurgy under heat transfer is in contact with an electrolyte which is pumped via pump 116 through a heat exchanger 112 through which electrolyte from electrolyte reservoir 114 is passed. The electrolyte flow rates and rates of heat transfer are adjusted to desired levels by adjusting flow regulator 118. A flowmeter 120 is in fluid communication for ease of adjustments. If added, the concentration of a passivator is measured using a standardized amperometric analyzer. A sample line 124 is optionally provided for convenience in withdrawing samples for testing.

Figure 2:
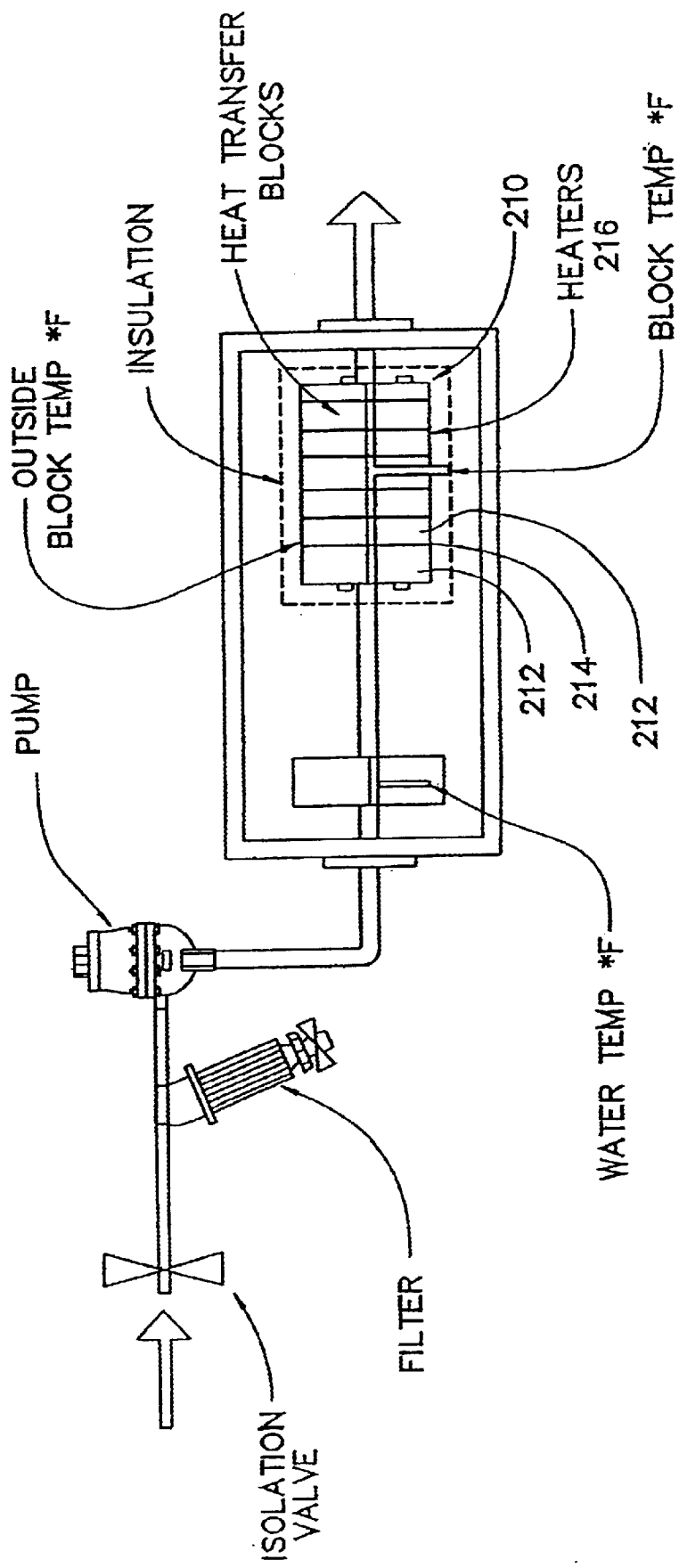
FIG. 2 illustrates a cross-sectional view of a MENTOR CHx device.

Now with further reference to FIG. 2, a block 210 is comprised of a series of pieces of the desired metallurgy 212 that are joined with an insulating material 214 placed between each adjoining piece. This series of adjoined pieces will be designated the "block." A hole (not shown) is incorporated at some part of the construction process through which the electrolyte will contact the block. The metal pieces making up the block are equipped with appropriate sensing apparatus (not shown) for the sensing of ECN and LPR. Other sensing apparatus for determination of temperature gradients, heat transfer coefficients, etc. can be applied in a way that does not interfere with the performance of ECN and LPR sensing apparatus. The block is equipped with a device 216 to provide heat thru the block. The block is combined with other supporting equipment necessary for replicating the operational environment of the heat transfer equipment in question. This can include, but is not limited to, equipment necessary for replicating electrolyte flow rate, electrolyte chemical parameters, and skin temperature at the heat exchanger electrolyte interface, etc.

The process control parameters are adjusted and controlled to replicate the operational environment at the heat exchanger metal-electrolyte interface. The heated element was made of 1010 carbon steel. A circulation pump was attached to a reservoir pump the water of desired chemistry through the testing element, a cooling coil and back to the reservoir.

The chemistry selected for removal of the insulating layers is based on the composition of the deposits. Therefore, in the following tests, since ferrous oxide was the primary composition, a peroxycitric acid solution or mineral acid was chosen for effectively removing the deposit. Other chelating, sequestering, and dispersing agents could also provide effective results when used in conjunction with peroxycarboxylic acid(s) solutions.

Water was prepared having the following chemical characteristics:

Calcium as $CaCO_3$=110 ppm

Total Alkalinity as $CaCO_3$=66 ppm

Chloride as $Cl^{31}$ =25 ppm pH=7.9

The 1010 carbon steel block temperature was set to 152° F. which achieved a calculated skin temperature of 144° F. Flow rate through the CHx was set at 3.8 gpm which equates to a velocity of 4 ft/sec. Steady state conditions were achieved and held during testing.

EXAMPLES

Baseline—Chromate Test

Figure 5:
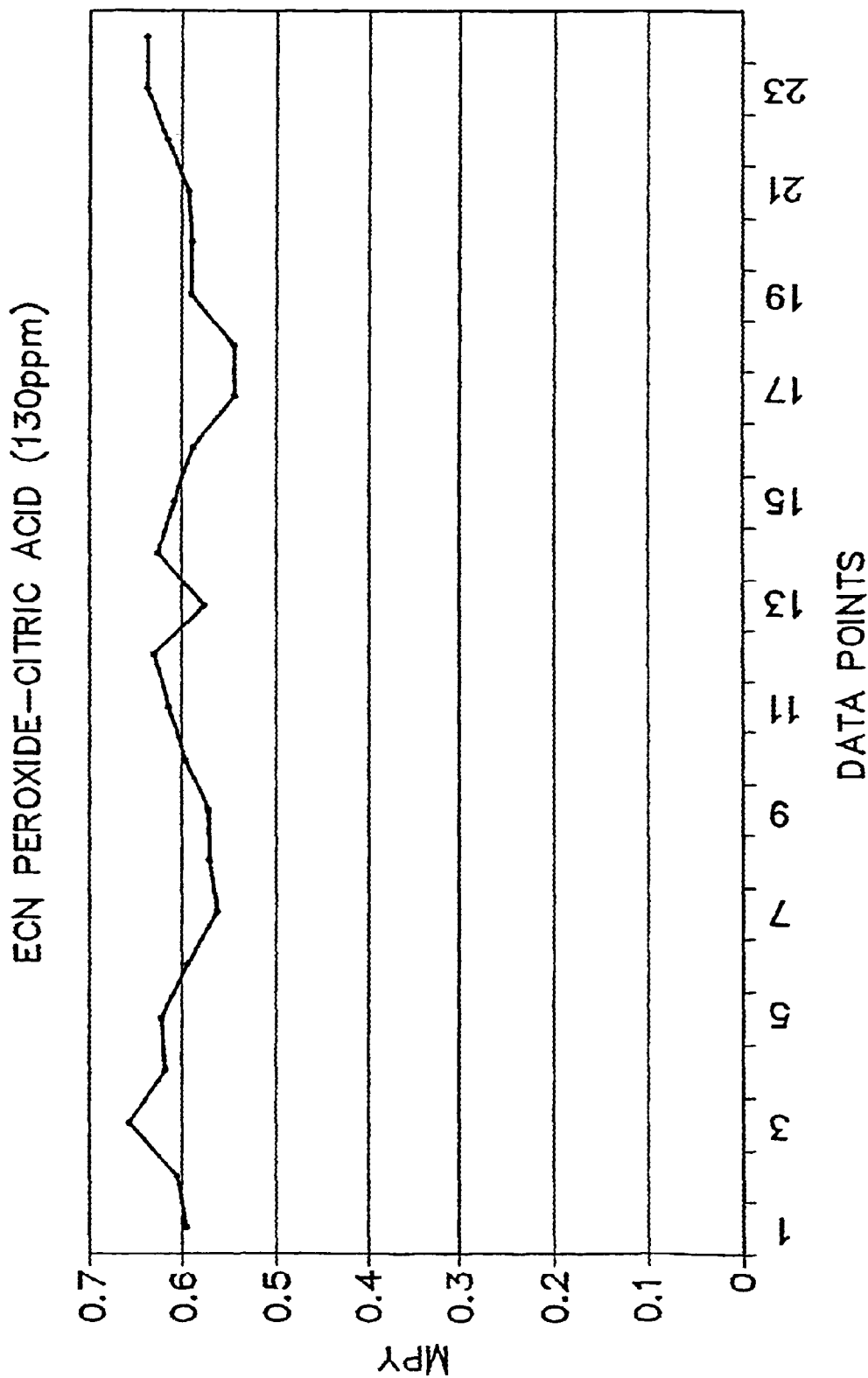
FIG. 5 is a graphical representation of ECN in the presence of Peroxide-Citric Acid.

Baseline data for chromate treatment was achieved using laboratory grade sodium chromate. Initially the system was treated with levels 4 times (1600 ppm) the normal concentration of chromate (as $CrO_4$) to induce passivation. After 2 hours of circulation under heat transfer, some of the water was removed while it was replaced with identical quality makeup water without the chromate. The operating pH stabilized at 7.7 by the addition of the $H_2SO_4$. This dilution continued until the chromate level dropped to the test concentration of (330 ppm). The system was allowed to operate under steady state conditions to determine corrosion rates under the described conditions as depicted in FIG. 5.

Peroxide Test

Figure 4:
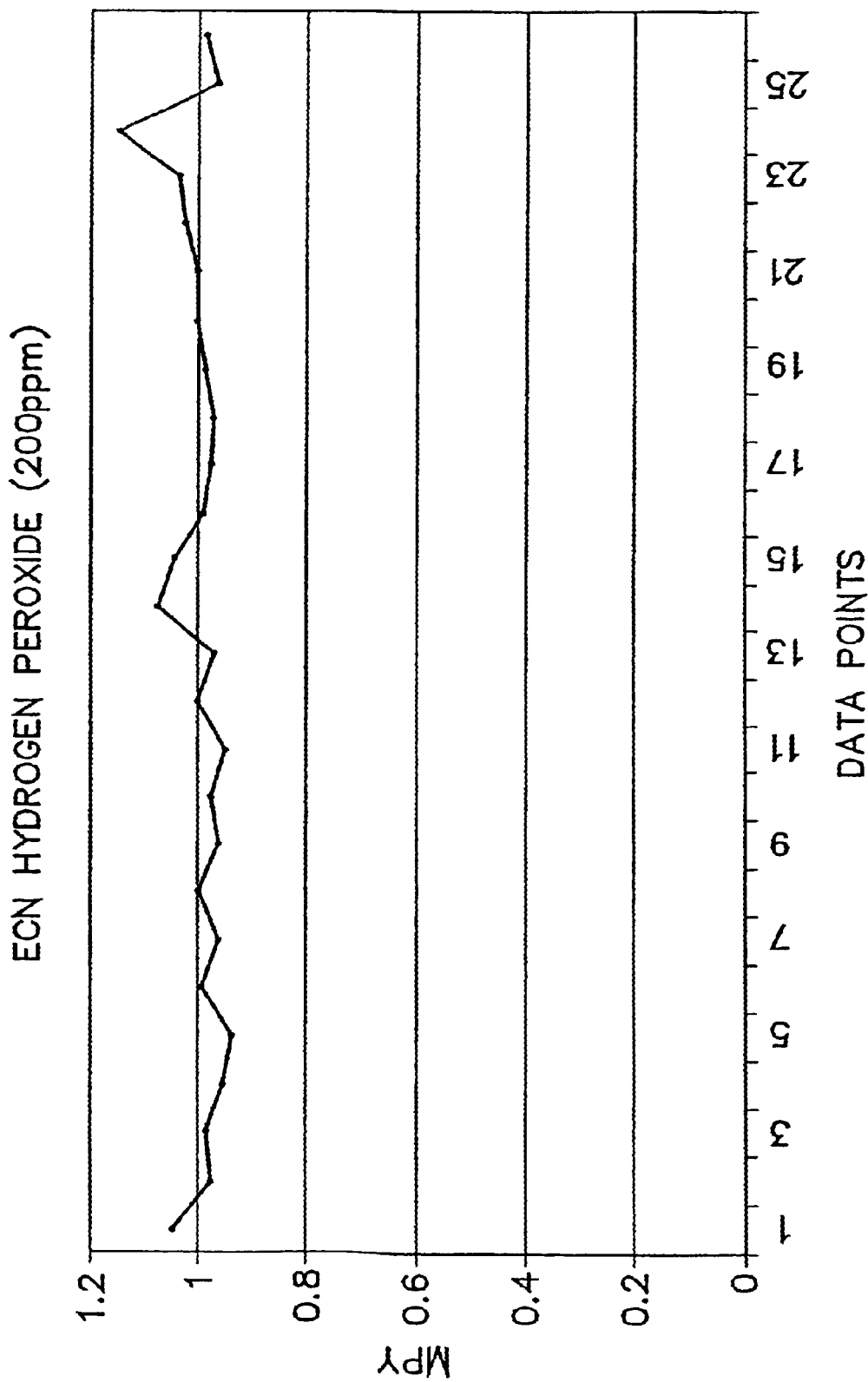
FIG. 4 is a graphical representation of ECN in the presence of Hydrogen Peroxide.

The system was allowed to circulate under heat transfer until it reached steady state. The water was treated with hydrogen peroxide to achieve an initial dosage of 200 ppm. The pH of the solution was adjusted to 7.4 by the addition of $H_2SO_4$. After reaching steady state, the ECN was monitored aid recorded as illustrated in FIG. 4. The system was then flushed until peroxide was undetectable and the pH of the circulating water equaled the flush water.

Figure 3:
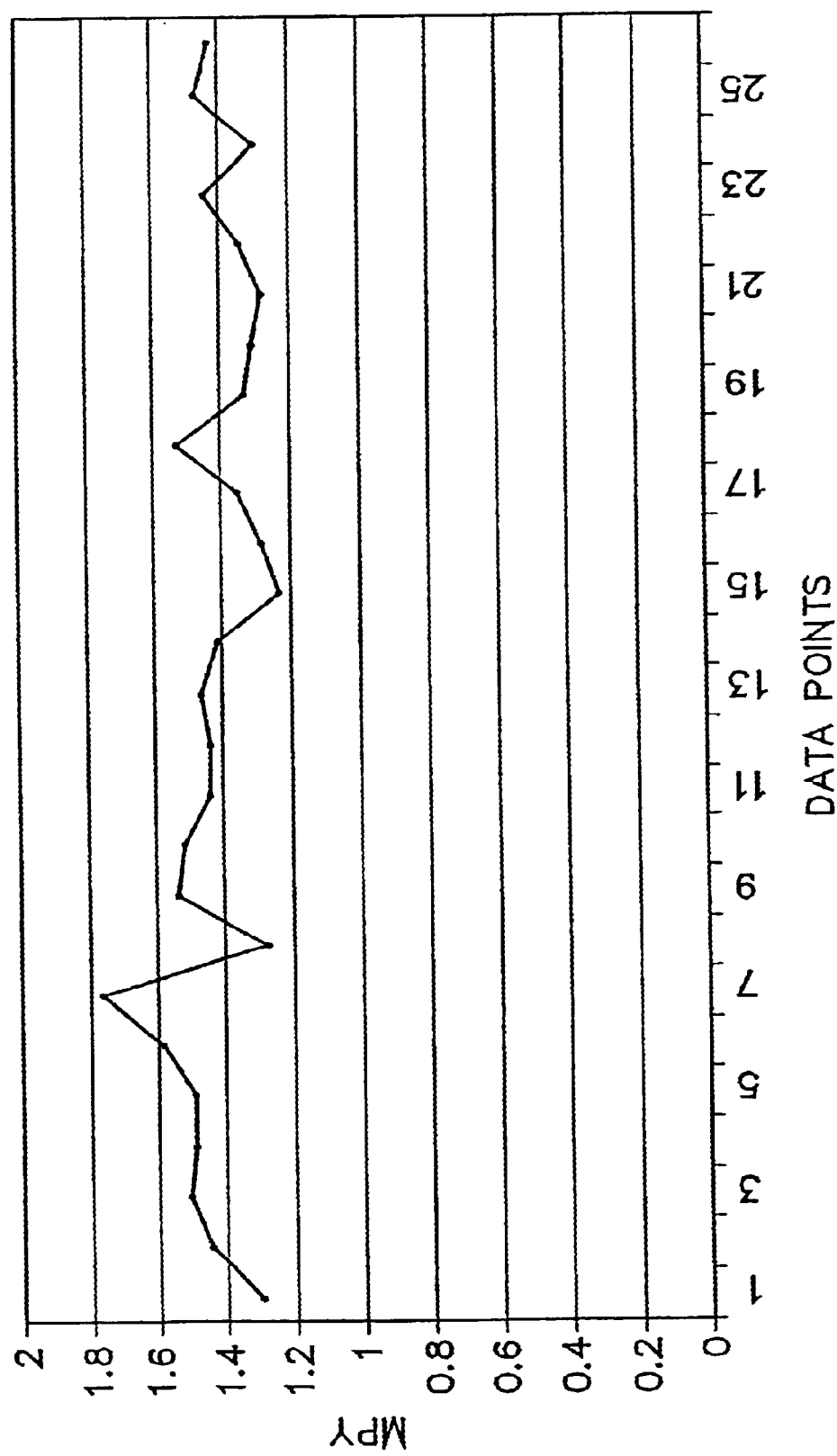
FIG. 3 is a graphical representation of Electro Chemical Noise (ECN) in the presence of Chromate.

FIG. 4 utilized the same water chemistry and heat load conditions as in FIG. 3, using hydrogen peroxide as the corrosion inhibitor.

The comparative results clearly indicate the improved corrosion inhibitor capability of the peroxide based treatment.

Peroxycarboxylic Acid Test

Peroxycarboxylic acids are formed from acids selected from the group consisting of formic acid, acetic acid, citric acid, oxalic acid, gluconic acid, glucoheptonic acid, succinic acid, acrylic acid, polyacrylic acid, maleic acid, polymaleic acid, polyepoxysuccinic acid, ethylene-diamine-tetraacetic acid, malonic acid, adipic acid, phosphonobutanepolycarboxylic acid and mixtures thereof.

As exemplified herein, peroxycitric acid is an equilibrium product of hydrogen peroxide and citric acid (a "solution" of a peroxycarboxylic acid is comprised of the peroxycarboxylic acid, hydrogen peroxide and the carboxylic acid). A solution of peroxycitric acid was prepared by combining a solution of citric acid, with 30% laboratory grade hydrogen peroxide. The ratio of the blend was 2:1 hydrogen peroxide to citric acid based on actives.

After flushing the system, 130 ppm of the blend was added to the water. The pH was measured at 6.8. After allowing the system to reach steady state, the ECN corrosion rate was monitored and recorded as illustrated in FIG. 5.

The results illustrate that hydrogen peroxide and peroxycarboxylic acids (and/or respective constituents thereof) provide superior corrosion inhibition compared to the long established industry standard chromate based treatment technology.

Cleaning Test

To achieve a skin temperature of 144° F., the CHx required 65.6412 BTU/hr. $ft^2 \times 10^3$. This was recorded as the baseline heat transfer under steady state conditions. The CHx was then exposed to a corrosive electrolyte under stagnant conditions for several days.

When the circulation pump was activated, red water was observed leaving the CHx. After allowing the system to reach steady state under heat transfer, the rate of heat transfer required to achieve a skin temperature of 144° F. was monitored and recorded as 52.8664 BTU/hr.$ft^2$33 $10^3$.

The lower heat transfer value indicates a 19.46% reduction in heat transfer efficiency due to the presence of corrosion byproducts (ferric oxide).

Figure 6:
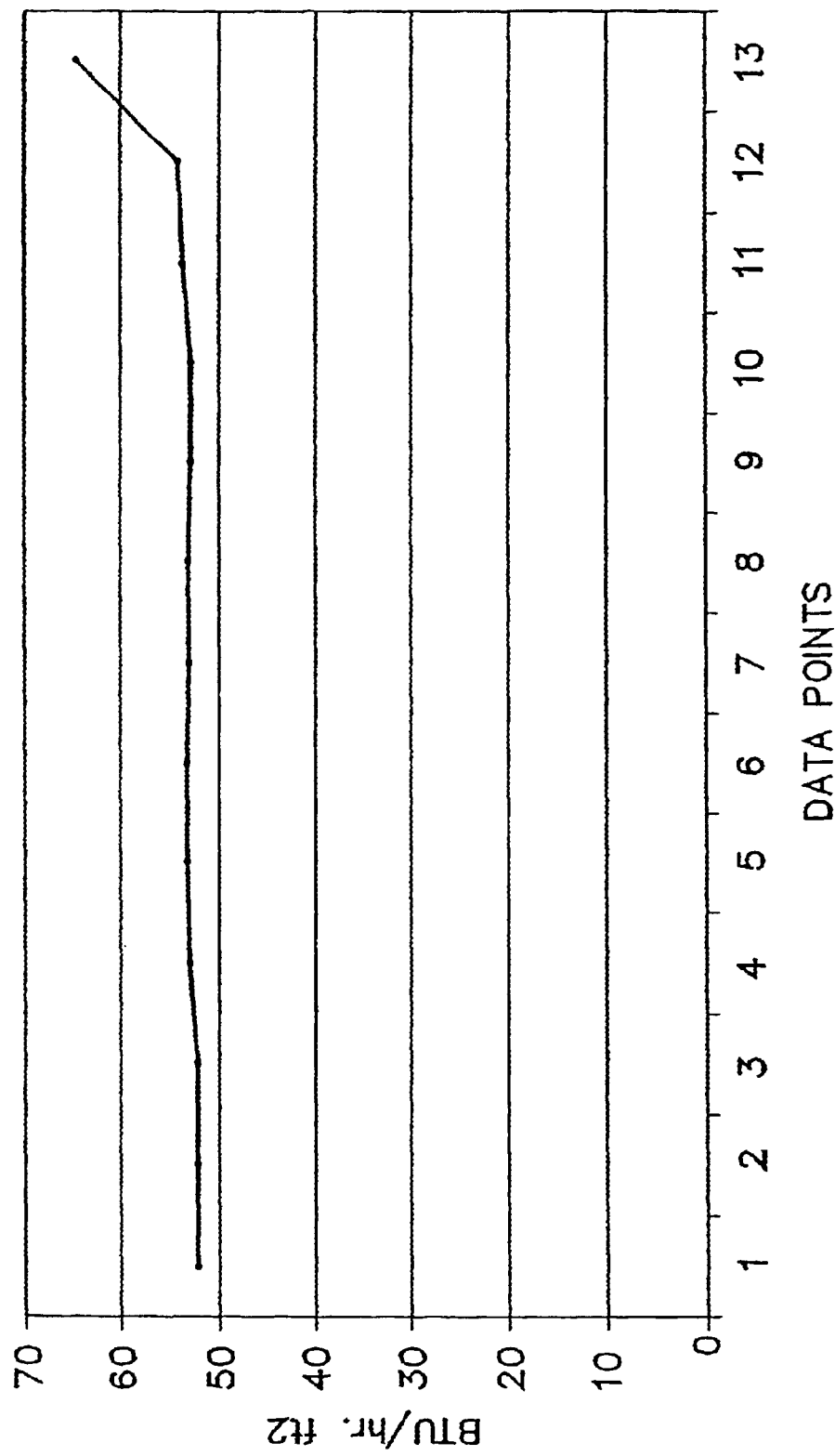
FIG. 6 is a graphical representation of Heat Transfer During Cleaning.
Figure 7:
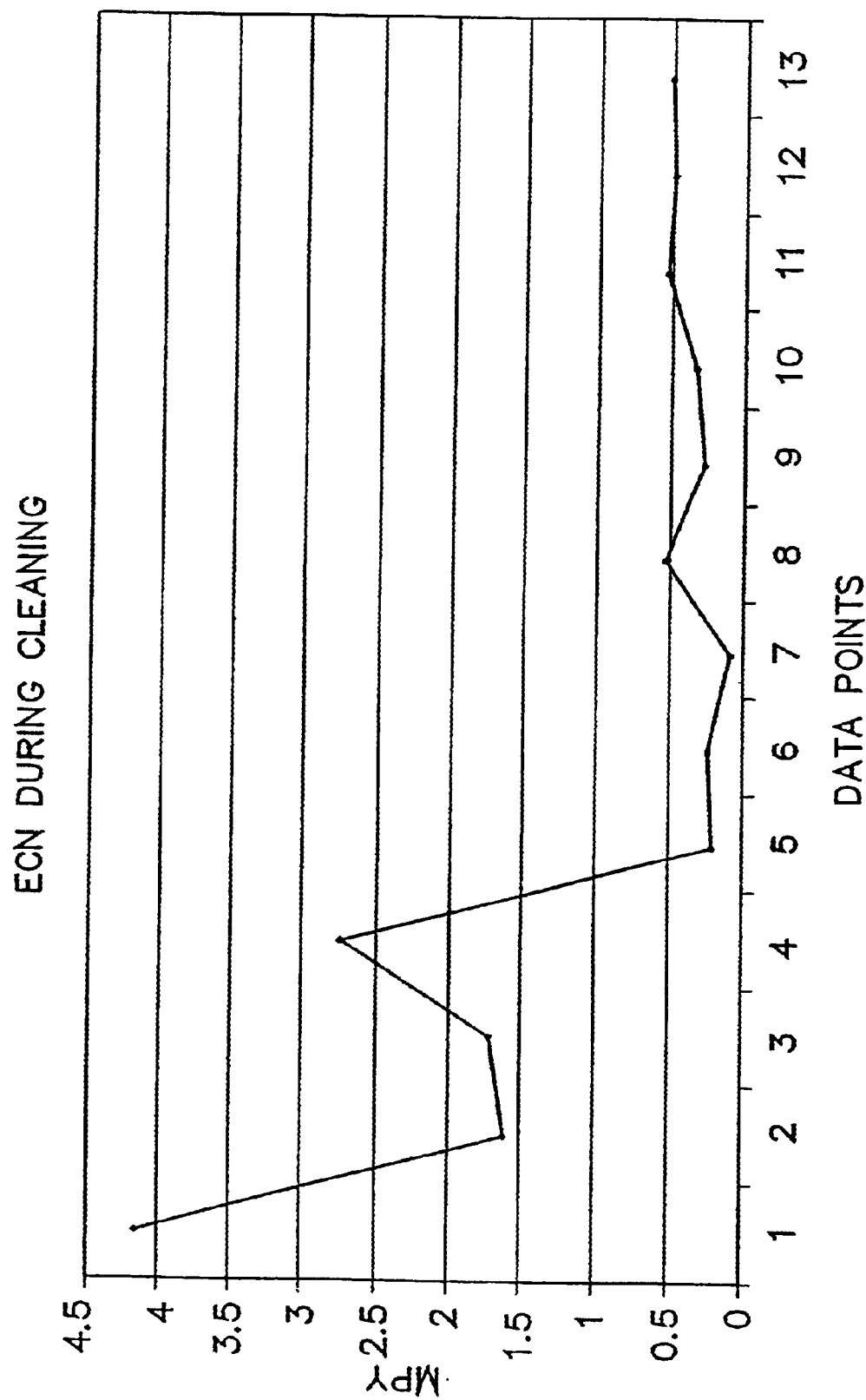
FIG. 7 is a graphical representation of ECN During Cleaning.

The electrolyte was initially treated with 1000 ppm of a peroxycitric acid solution made from a 2:1 actives weight ratio of hydrogen peroxide and citric acid. FIG. 6 illustrates the heat transfer increased (data point 4) while ECN (FIG. 7) showed a corresponding rise in corrosion rate. ECN corrosion rates then dramatically drop (data point 5), followed by the onset of a passive-steady state condition (data points 8–13).

By data point 12 (FIG. 6), heat transfer recovered 22% of the lost heat transfer resulting from the removal of much of the insulating ferric oxide.

Figure 8:
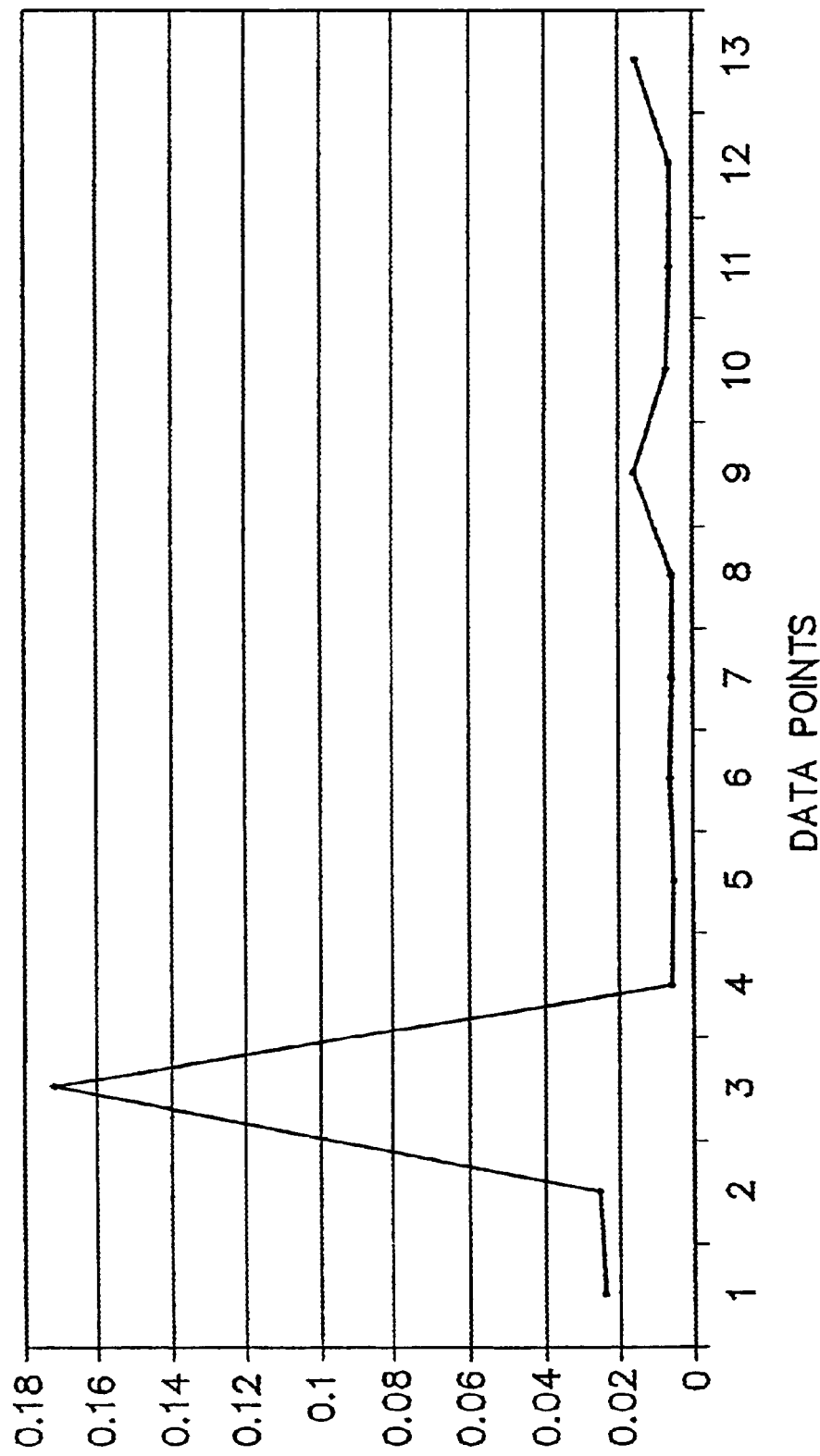
FIG. 8 is a graphical representation of Activity Factor (AF) During Cleaning.

Data point 13 shows the affects of adding 1000 ppm of HCl (based on active (s)). Heat transfer is completely restored while maintaining unprecedented control of ECN corrosion rate and Activity Factor (FIG. 8). The "Activity Factor" (AF) is calculated using the equation:

$$AF = \sigma_i / i_{rms}$$

where $\sigma_i$ is the standard deviation of the electrochemical current noise data, and $i_{rms}$ is the root mean square of the electrochemical current noise. The AF detects changes in current and highlights the deviation from the steady state condition.

Test results clearly illustrate the cleaning and corrosion inhibition capabilities of peroxycarboxylic acid solutions. Even in the presence of high chlorides and low pH (~4.0), pitting corrosion was averted, and corrosion rates were controlled while regaining 100% efficiency.

This technology can also be utilized in conjunction with other corrosion inhibitors to improve their performance. Examples of such other corrosion inhibitors include but are not limited to orthophosphates, polyphosphates, phosphonates, zinc and azoles. It is further understood that the instant treatment technology could, and in many cases would be utilized with other water treatments such as deposit control agents, corrosion inhibitors and microbiological control agents.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method of inhibition of corrosion of a metal which experiences active-passive transition while in contact wit an electrolyte comprising:

incorporating one or more peroxycarboxylic acids or their constituents with said electrolyte at a concentration effective to passivate the surface of the metal; and determining an activity factor of the metal.

2. The method in accordance with claim 1 wherein said metal is selected from the group consisting of steel(s), aluminum, titanium and mixtures thereof.

3. The method in accordance with claim 1 wherein said peroxycarboxylic acids are formed from acids selected from the group consisting of formic acid, acetic acid, citric acid, oxalic acid, gluconic acid, glucoheptonic acid, succinic acid, acrylic acid, polyacrylic acid, maleic acid, polymaleic acid, polyepoxysuccinic acid, ethylene-diamine-tetraacetic acid, malonic acid, adipic acid, phosphonobutanepolycarboxylic acid and mixtures thereof.

4. The method in accordance with claim 1, further comprising the step of incorporating a chelating agent into said electrolyte.

5. The method in accordance with claim 1, further comprising the step of incorporating a sequestering agent into said electrolyte.

6. The method in accordance with claim 1, further comprising the step of incorporating a dispersing agent into said electrolyte.

7. The method in accordance with claim 1, wherein said peroxycarboxylic acid comprises peroxycitric acid.

* * * * *